United States Patent
Kang et al.

(10) Patent No.: US 8,539,045 B2
(45) Date of Patent: Sep. 17, 2013

(54) HOST SYSTEM AND REMOTE DEVICE SERVER FOR MAINTAINING VIRTUAL CONNECTIVITY DURING LIVE MIGRATION OF VIRTUAL MACHINE, AND CONNECTIVITY MAINTAINING METHOD USING THE SAME

(75) Inventors: Dong-oh Kang, Daejeon (KR); Jeun Woo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 147 days.

(21) Appl. No.: 13/281,954

(22) Filed: Oct. 26, 2011

(65) Prior Publication Data

US 2012/0102156 A1 Apr. 26, 2012

(30) Foreign Application Priority Data

Oct. 26, 2010 (KR) ........................ 10-2010-0104725

(51) Int. Cl.
*G06F 15/16* (2006.01)
(52) U.S. Cl.
USPC ............ 709/219; 709/223; 709/227; 370/401
(58) Field of Classification Search
USPC .......................... 709/219, 223, 227; 370/401
See application file for complete search history.

(56) References Cited

U.S. PATENT DOCUMENTS

| | | | | |
|---|---|---|---|---|
| 7,640,582 B2 * | 12/2009 | Beck | ............................... | 726/21 |
| 8,150,971 B2 * | 4/2012 | Lublin et al. | ................... | 709/226 |
| 8,363,666 B2 * | 1/2013 | Donthamsetty et al. | ...... | 370/401 |
| 2005/0240712 A1 | 10/2005 | Klein | | |
| 2005/0251802 A1 | 11/2005 | Bozek et al. | | |
| 2005/0268298 A1 | 12/2005 | Hunt et al. | | |
| 2007/0300004 A1 | 12/2007 | Yun | | |
| 2009/0007099 A1 | 1/2009 | Cummings et al. | | |
| 2009/0144389 A1 * | 6/2009 | Sakuta | .......................... | 709/215 |
| 2010/0154054 A1 * | 6/2010 | Beck | ............................... | 726/21 |
| 2010/0169494 A1 * | 7/2010 | Machulsky et al. | ........... | 709/227 |
| 2010/0306381 A1 * | 12/2010 | Lublin et al. | ................... | 709/226 |
| 2011/0022711 A1 * | 1/2011 | Cohn | ............................ | 709/225 |
| 2011/0035620 A1 * | 2/2011 | Elyashev et al. | .................. | 714/4 |
| 2012/0102156 A1 * | 4/2012 | Kang et al. | .................... | 709/219 |

FOREIGN PATENT DOCUMENTS

KR 1020070121452 12/2007
KR 1020100063869 6/2010

OTHER PUBLICATIONS

Kang, Dong-oh et al., "A New Remote USB Architecture for Live Migration of Virtual Machines in SoD (System on-Demand) Service," International Conference on Control, Automation and Systems (2010).

* cited by examiner

*Primary Examiner* — Wing F Chan
*Assistant Examiner* — Tesfay Yohannes
(74) *Attorney, Agent, or Firm* — Nelson Mullins Riley & Scarborough LLP

(57) ABSTRACT

A host system includes: a virtual machine migration controller for performing live-migration of a virtual machine and driving the virtual machine; and a virtual connection unit for establishing a virtual connection with a remote device server to which a device allocated to the virtual machine is connected. The host system further includes and a virtual controller for providing information for establishing the virtual connection to a destination host of the live-migration, or receiving the information for establishing the virtual connection from a source host from which the live-migration starts and providing the information to the virtual connection unit, driving the virtual machine which has live-migrated.

12 Claims, 7 Drawing Sheets

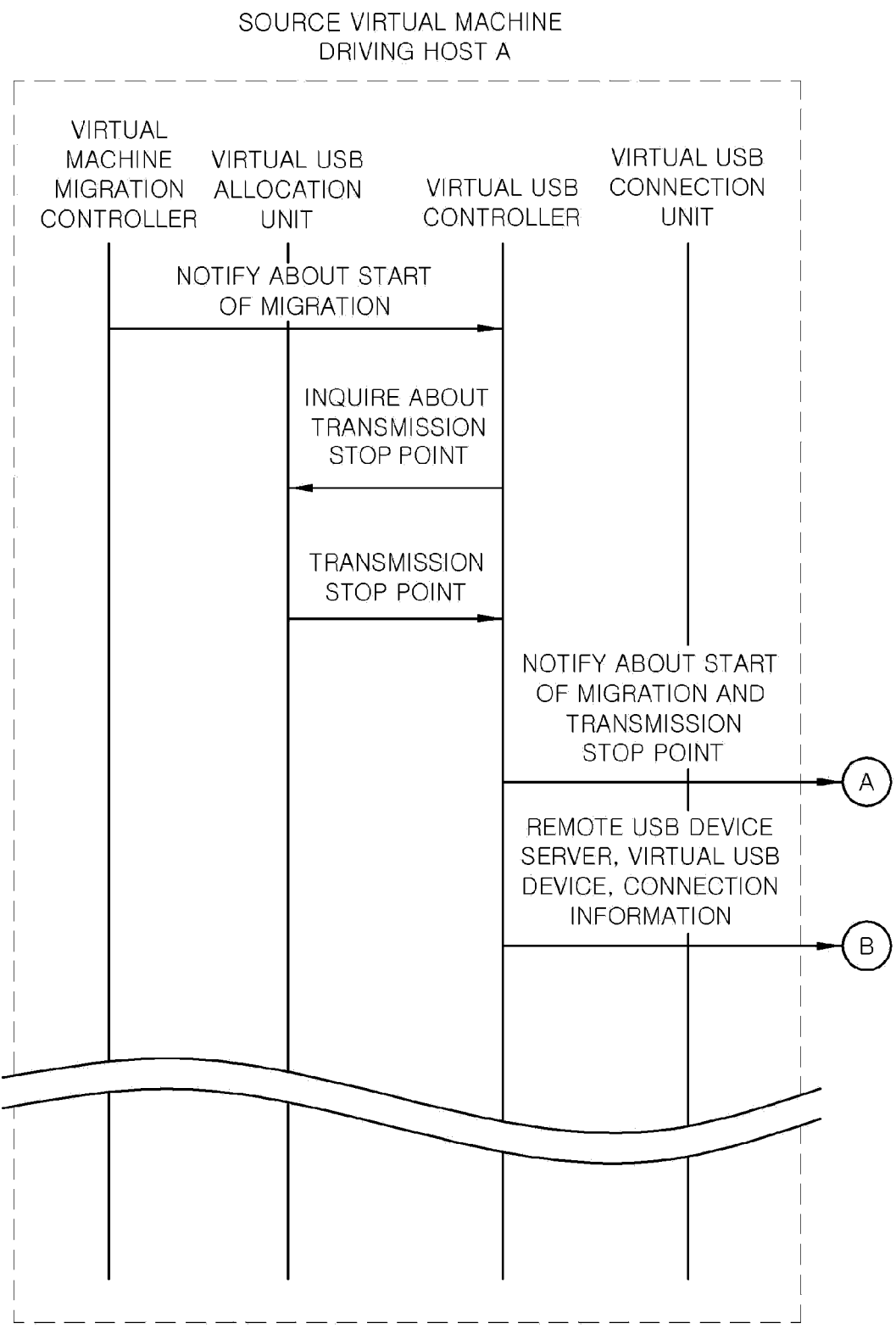

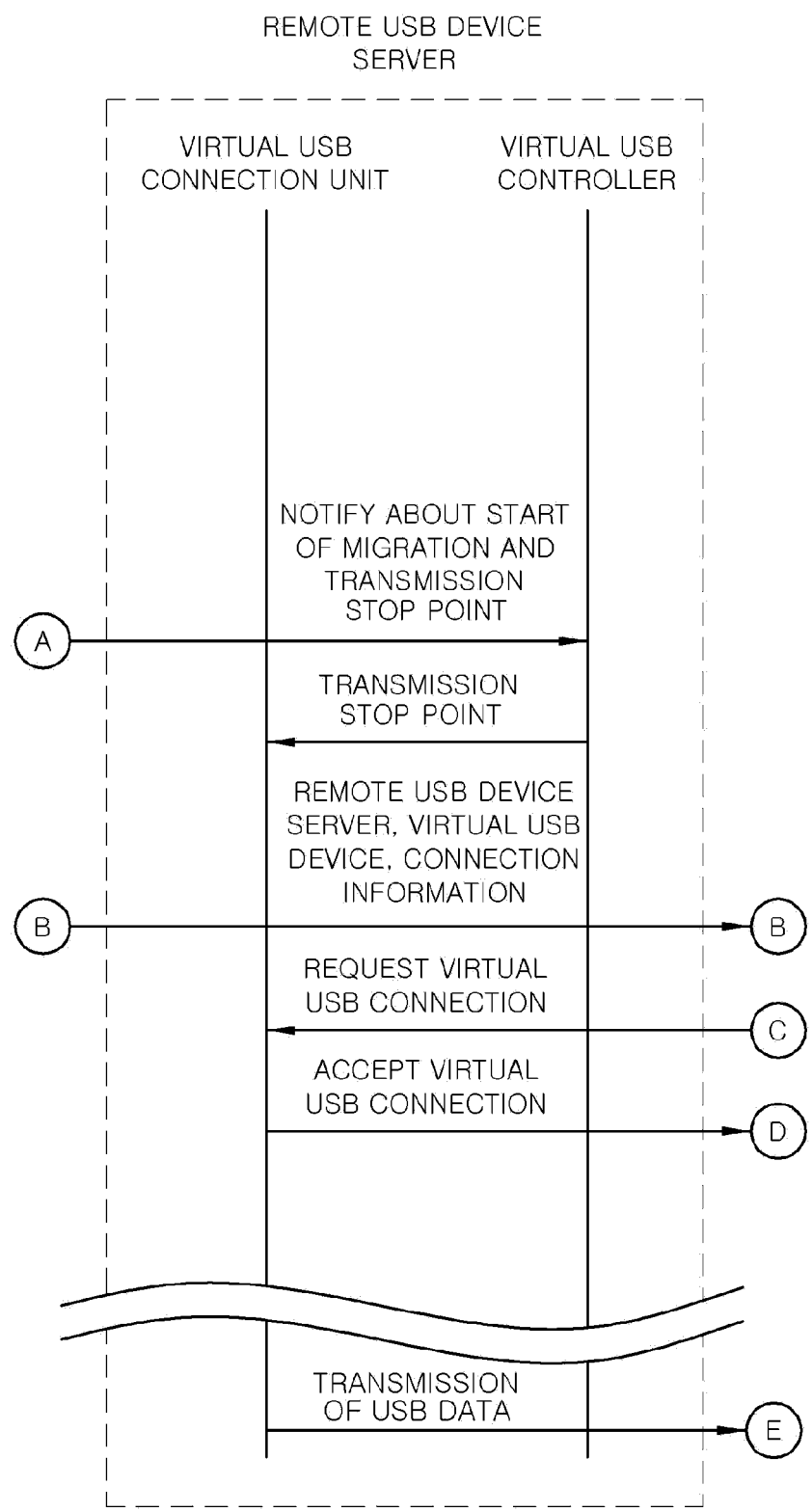

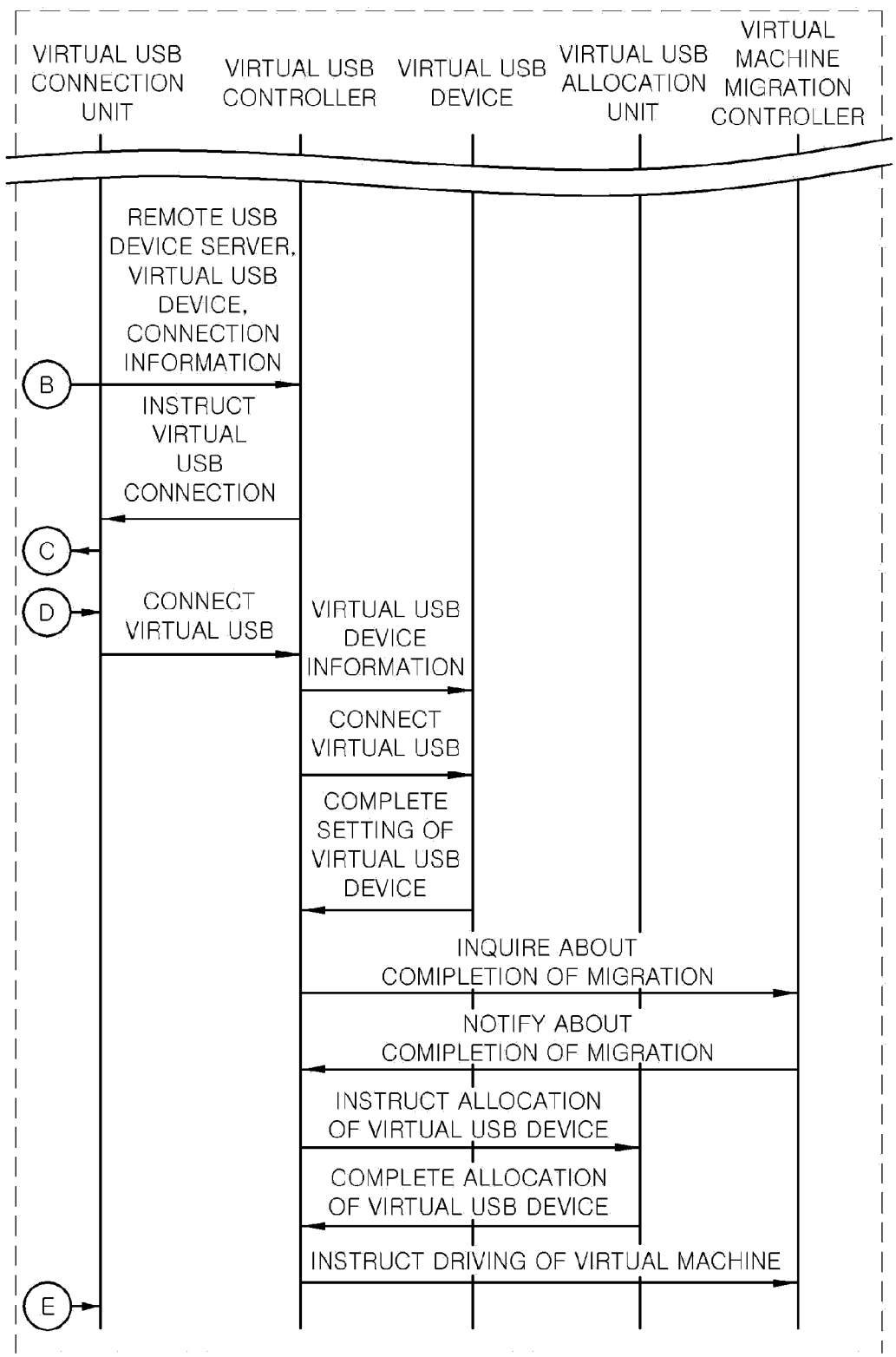

HOST SYSTEM AND REMOTE DEVICE SERVER FOR MAINTAINING VIRTUAL CONNECTIVITY DURING LIVE MIGRATION OF VIRTUAL MACHINE, AND CONNECTIVITY MAINTAINING METHOD USING THE SAME

CROSS-REFERENCE(S) TO RELATED APPLICATION

The present invention claims priority of Korean Patent Application No. 10-2010-0104725, filed on Oct. 26, 2010, which is incorporated herein by reference.

FIELD OF THE INVENTION

The present invention relates to maintaining connectivity during live migration of a virtual machine, and more particularly, to a remote host system and a remote device server for maintaining virtual connectivity in live-migration of a virtual machine in order to allow a virtual machine user to constantly or seamlessly use a virtual device by maintaining a virtual connection between the virtual machine and a remote device virtually connected to the virtual machine even when the virtual machine moves to another physical host through live migration, and a connectivity maintaining method using the same.

BACKGROUND OF THE INVENTION

A USB operation is performed by a USB device and a USB host. The USB device, which provides its function to the USB host, serves as a server, and the USB host operates as a client which controls the USB device and requests the function of the USB device.

A remote USB technique, which virtually performs the functions of the USB device and USB host, enables a remotely existing USB device to operate in the same manner as that of a local USB device through a network. A remote USB device server connected through a network is recognized by an upper user program and an operating system (OS) like the USB device connected to a local USB connection terminal does. Therefore, the remote USB device server and the remote USB host are connected through a network and virtualized each other so as to operate. In this manner, the conventional remote USB technique allows a USB device not attached to a local host to be virtualized as a USB device attached to the local host so as to operate. Its application to a virtualization system server driving a virtual machine allows for a virtual USB virtualizing a remote USB device as a USB device of a virtual machine.

However, when the virtual machine live-migrates from one physical host to another physical host for the reason of load balancing or the like, a connection from the virtual USB is cut off, potentially stopping a data transmission, or the like performed by the virtual USB to lose data. Thus, a virtual machine is restricted in using the virtual USB of the virtual machine due to the live migration of the virtual machine, and due to this problem, the live migration of the virtual machine according to a network environment, a load state of a server, a failure recovery, and the like is not supported when a manager of a server pool that drives the virtual machine uses the virtual USB. Namely, a management of resources of the server driving the virtual machine is restricted.

SUMMARY OF THE INVENTION

Therefore, the present invention provides a remote host system and a remote device server for maintaining virtual connectivity in live migration of a virtual machine in order to allow the user of the virtual machine to continuously or seamlessly use a virtual device by maintaining a virtual connection between the virtual machine and a remote device virtually connected to the virtual machine even when the virtual machine moves to another physical host through live migration, and a connectivity maintaining method using the same.

In accordance with an aspect of the present invention, there is provided a host system for maintaining virtual connectivity in live-migration of a virtual machine: a virtual machine migration controller for performing live-migration for moving a virtual machine and driving the virtual machine; a virtual connection unit for establishing a virtual connection with a remote device server to which a device allocated to the virtual machine is connected, and receiving from the remote device server data transmitted from the device during the live-migration; and a virtual controller for providing information for establishing the virtual connection to a destination host of the live-migration, or receiving the information for establishing the virtual connection from a source host from which the live-migration starts and providing the information to the virtual connection unit, driving the virtual machine which has live-migrated by controlling the virtual machine migration controller to thereby provide the data received by the virtual connection unit to the driven virtual machine.

In accordance with another aspect of the present invention, there is provided a remote device server for maintaining virtual connectivity in live-migration of a virtual machine including: a core function unit for recognizing a device connected to a connection terminal and performing an operation of the device; a virtual host unit for controlling the device recognized by the core function unit and connected to a virtual machine driving host through a network for allowing the device to be recognized as a virtual device; and a virtual connection unit for establishing a virtual connection with a new host to which a virtual machine, to which the virtual device was allocated, has moved through live-migration, and transmitting data transmitted to and received from the device during the live-migration to the new host.

In accordance with still another aspect of the present invention, there is provided a method for maintaining virtual connectivity in live-migration of a virtual machine including: when a virtual machine to which a device had been allocated starts live-migration, recognizing a transmission stop point in data transmission, and then providing the transmission stop point to a remote device server to which the device is connected, so that data transmitted to or received from the device during the live-migration can be stored in the remote device server; transmitting, by the virtual machine, information for maintaining connectivity to a host to which the virtual machine live-migrates, to establish a virtual connection between the remote device server and the host, and allocating the device to the host; and transmitting the data stored in the remote device server to the host as the virtual connection is established, so as to be stored in the host, and when the live-migration is completed, transferring the data stored in the host to the virtual machine which has live-migrated.

In accordance with still another aspect of the present invention, there is provided a method for maintaining virtual connectivity in live-migration of a virtual machine including: as a device is connected to a connection terminal, connecting the device to a virtual machine driving host through a network, to be connected to a virtual machine; when the virtual machine starts live-migration, receiving a transmission stop point in data transmission from the virtual machine driving host; storing data transmitted to and received from the device starting from the transmission stop point; establishing a virtual connection with a new host in response to a request from the new host to which the virtual machine is to be moved through live-migration; providing the stored data to the new host after establishment of the virtual connection; and when the virtual machine has been completely moved to the new host through live-migration, stopping storing of the data.

BRIEF DESCRIPTION OF THE DRAWINGS

The objects and features of the present invention will become apparent from the following description of embodiments, given in conjunction with the accompanying drawings, in which:

FIGS. 5A to 5C show a flowchart illustrating a method for maintaining connectivity when a virtual machine performs live-migration in the remote USB system in accordance with the embodiment of the present invention.

DETAILED DESCRIPTION OF THE EMBODIMENT(S)

Figure 1:
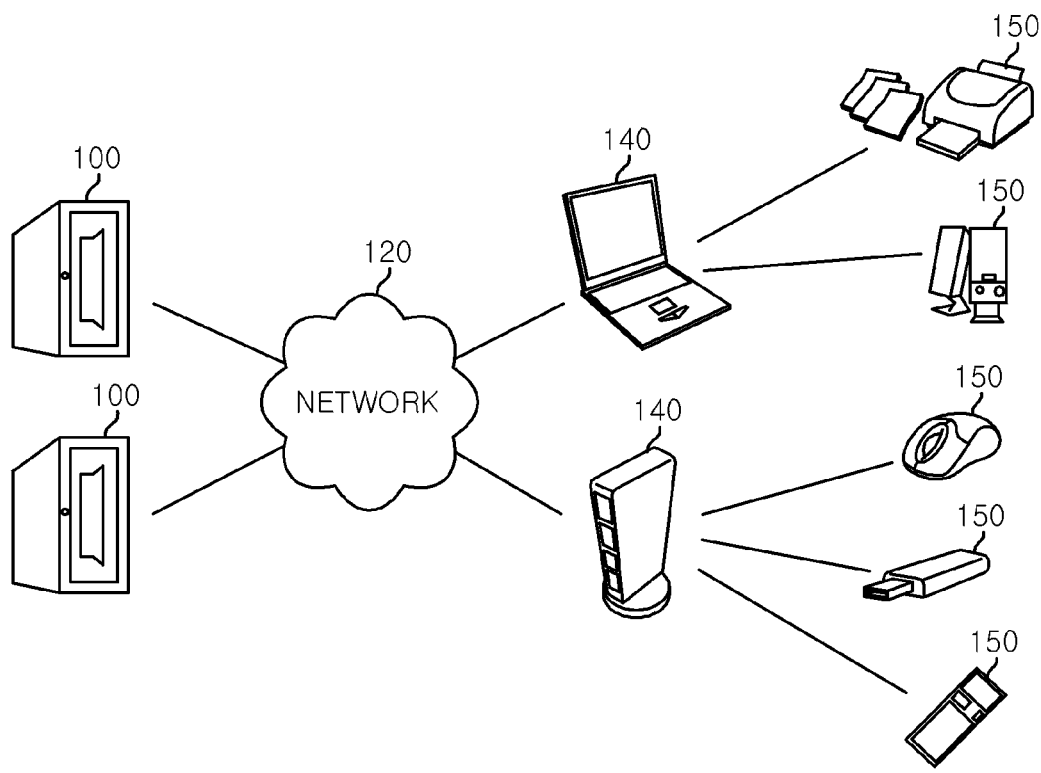
FIG. 1 is a view showing an overall configuration of a remote USB system in accordance with an embodiment of the present invention.

Embodiments of the present invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms should be defined throughout the description of the present invention.

Combinations of respective blocks of block diagrams attached herein and respective steps of a sequence diagram attached herein may be carried out by computer program instructions. Since the computer program instructions may be loaded in processors of a general purpose computer, a special purpose computer, or other programmable data processing apparatus, the instructions, carried out by the processor of the computer or other programmable data processing apparatus, create devices for performing functions described in the respective blocks of the block diagrams or in the respective steps of the sequence diagram. Since the computer program instructions, in order to implement functions in specific manner, may be stored in a memory useable or readable by a computer aiming for a computer or other programmable data processing apparatus, the instruction stored in the memory useable or readable by a computer may produce manufacturing items including an instruction device for performing functions described in the respective blocks of the block diagrams and in the respective steps of the sequence diagram. Since the computer program instructions may be loaded in a computer or other programmable data processing apparatus, instructions, a series of processing steps of which is executed in a computer or other programmable data processing apparatus to create processes executed by a computer so as to operate a computer or other programmable data processing apparatus, may provide steps for executing functions described in the respective blocks of the block diagrams and the respective steps of the sequence diagram.

Moreover, the respective blocks or the respective steps may indicate modules, segments, or some of codes including at least one executable instruction for executing a specific logical function(s). In several alternative embodiments, it is noticed that functions described in the blocks or the steps may run out of order. For example, two successive blocks and steps may be substantially executed simultaneously or often in reverse order according to corresponding functions.

Hereinafter, the embodiment of the present invention will be described in detail with the accompanying drawings.

FIG. 1 is a view showing an overall configuration of a remote USB system in accordance with an embodiment of the present invention. The remote USB system includes a virtual machine driving host 100, a network 120, a remote USB device server 140, multiple USB devices 150 and the like.

The virtual machine driving host 100 is a device for providing functions of managing a virtual machine, booting a virtual machine, allocating a new virtual machine, migration of a virtual machine and the like. The virtual machine driving host 100 includes a scheme of using a virtual machine monitor (VMM) or a hypervisor and a scheme having a host operating system and the like.

The virtual machine driving host 100 in accordance with the embodiment of the present invention performs functions of allocating the USB device 150 connected to the remote USB device server 140 on a virtual machine to perform emulation of the USB device 150, and maintaining connectivity for USB data transmitted to and received from the USB device 150 during live migration.

Figure 2:
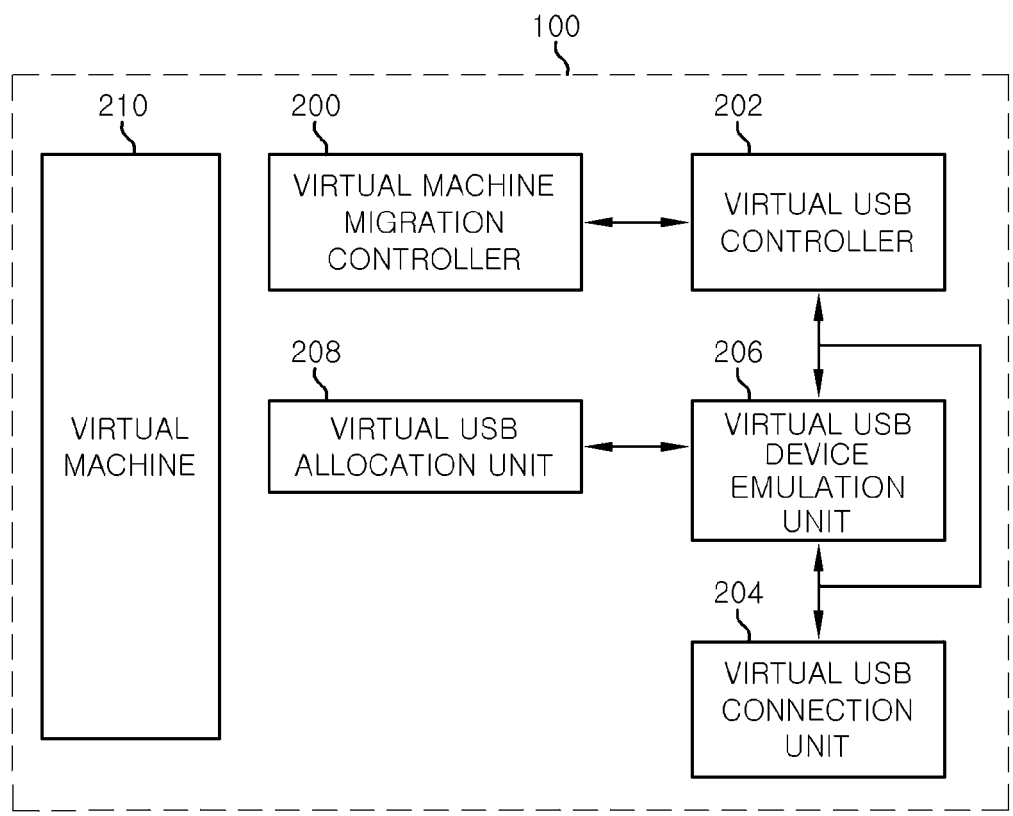
FIG. 2 is a block diagram showing a configuration of a virtual machine driving host in the remote USB system in accordance with the embodiment of the present invention.

To this end, as shown in FIG. 2, the virtual machine driving host 100 includes: a virtual machine migration controller 200; a virtual USB controller 202; a virtual USB connection unit 204 for controlling a virtual USB connection with the remote USB device server 140; a virtual USB device emulation unit 206 for performing a setting for emulating the USB device 150 to be allocated on a virtual machine 210; a virtual USB allocation unit 208 for allocating the remote USB device 150 virtualized by the virtual USB device emulation unit 206 to the virtual machine 210 to perform I/O virtualization of the virtual machine 210 with respect to the USB device 150; and one or more virtual machine 210.

Herein, migration refers to moving the virtual machine 210 from a source virtual machine driving host to a destination virtual machine driving host and newly driving the virtual machine 210 in the destination virtual machine driving host. Herein, the virtual machine moved from the source virtual machine driving host to the destination virtual machine driving host is driven in the same state as it was executed in the source virtual machine driving host 100 without re-booting the virtual machine 210.

The virtual machine migration controller 200 drives the virtual machine 210 or migrates the virtual machine 210 to a different virtual machine driving host (destination virtual machine driving host) and drives the virtual machine 210 which has migrated to the different virtual machine driving host.

The virtual machine migration controller 200 performs live migration on the virtual machine 210 depending on a driving server management program or an operator's command, and when live migration starts, the virtual machine migration controller 200 informs the virtual USB controller 202 accordingly.

As the live migration starts, the virtual USB controller 202 inquires of the virtual USB allocation unit 208 about a transmission stop point and receives the transmission stop point, and transmits the received transmission point to the remote USB device server 140. Herein, the transmission stop point in data transmission refers to a point in data transmission at which a data transmission and reception to and from the USB device 150 physically connected to the remote USB device server 140 is stopped.

Further, the virtual USB controller 202 transmits migration information including information on a virtual USB connection, information on the remote USB device server 140 to which the USB device 150 allocated to the virtual machine 210 is physically connected, and information on the USB device 150 allocated to the virtual machine 210 which live-migrates to the destination virtual machine driving host. As the migration information is received from the source virtual machine driving host, the virtual machine driving host 100 in the destination virtual machine driving host establishes a virtual USB connection with the remote USB device server 140 by using the migration information received by the virtual USB controller 202. In other words, the virtual USB controller 202 provides the migration information to the destination virtual machine driving host 100 or provides the migration information received from the source virtual machine driving host to the virtual USB connection unit 204 to request a virtual USB connection. Further, the virtual USB controller 202 provides the information on the USB device 150 allocated to the virtual machine 210 and the virtual USB connection information to the virtual USB device emulation unit 206.

The virtual USB connection unit 204 requests the remote USB device server 140 for a virtual USB connection by using the migration information, and establishes a virtual connection with the remote USB device server 140 upon acceptance of the remote USB device server 140.

Further, the virtual USB connection unit 204 includes a buffer memory (not shown) which receives USB data, transmitted to and received from the USB device 150 after the transmission stop point, from the remote USB device server 140 during the live migration and stores the same.

The virtual USB device emulation unit 206 serves to set for emulating the USB device 150 allocated to the virtual machine 210. Namely, the virtual USB device emulation unit 206 receives the information on the USB device 150 allocated to the virtual machine 210 and the virtual USB connection information from the virtual USB controller 202, and then performs a setting for emulating the USB device to be allocated to the virtual machine 210 based on those information. As such a setting is completed, the virtual USB device emulation unit 206 informs the virtual USB controller 202 accordingly.

After the setting for the emulation of the USB device to be allocated to the virtual machine 210, the virtual USB controller 202 informs the virtual USB allocation unit 208 accordingly, and the virtual USB allocation unit 208 allocates the USB device 150 to the virtual machine 210 which has migrated. When the USB device 150 is allocated to the migrated virtual machine 210, the virtual USB controller 202 requests the virtual machine migration controller 200 to drive the virtual machine 210. At this time, the USB data stored in the buffer memory of the virtual USB connection unit 204 in the destination virtual machine driving host 100 may be transferred to the virtual machine 210, which have live-migrated, through the virtual USB device emulation unit 206.

The remote USB device server 140 has one or plural connection terminals to which various USB devices 150 may be connected, and includes a USB host controller to control the USB device 150 connected to the connection receptacle and use a corresponding function.

Figure 3:
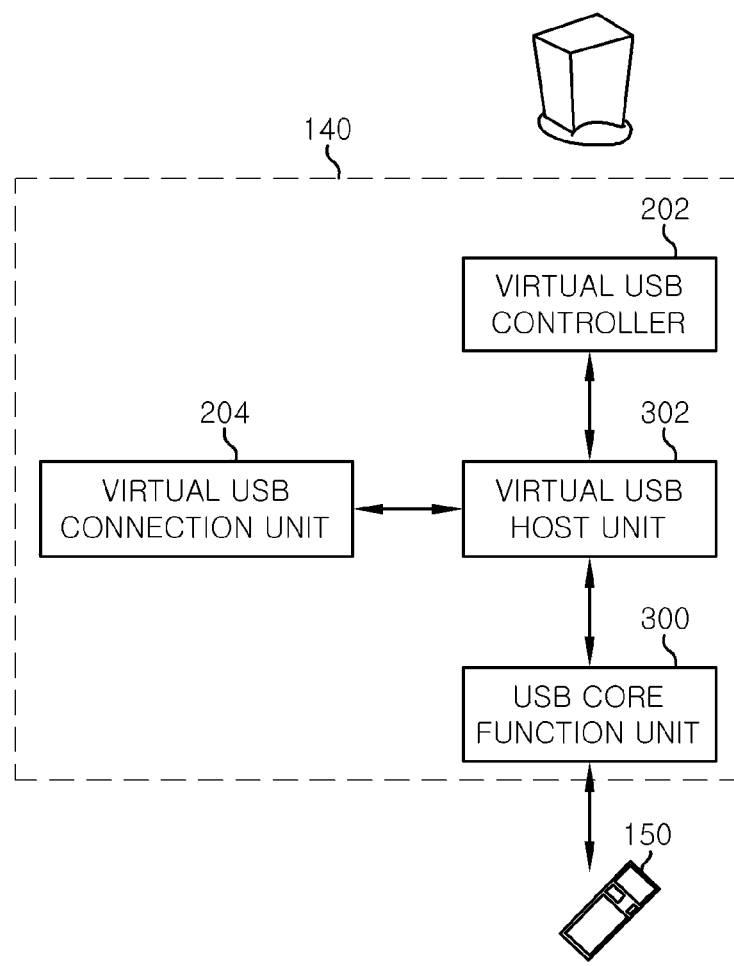
FIG. 3 is a block diagram showing a configuration of a remote USB device server in the remote USB system in accordance with the embodiment of the present invention.

The remote USB device server 140 is connected to the virtual machine driving host 100 through the network 120, and maintains a virtual USB connection when the virtual machine 210 within the virtual machine driving host 100 makes live migration (or live-migrates). As shown in FIG. 3, the remote USB device server 140 includes the same virtual USB controller 202 and the virtual USB connection unit 204 as those in the virtual machine driving host 100, and further includes a USB core function unit 300 for controlling the physically connected USB device 150, a virtual USB host unit 302, and the like.

The USB core function unit 300 performs a basic USB operation upon recognizing the USB device 150 connected to a connection receptacle in a plug-and-play manner.

The virtual USB host unit 302 controls the USB device 150 attached to the connection terminal of the remote USB device server 140 through the USB core function unit 300, and may be connected to the virtual machine driving host 100, which is a remote USB host, through the virtual USB connection unit 204 and the network 120. Namely, the virtual USB host unit 302 may be a virtual proxy for performing a host function with respect to the USB device 150 in the place of the virtual machine driving host 100.

When the virtual machine 210, to which the USB device 150 has been allocated, moves through live migration, so the virtual machine driving host 100 is changed, the virtual USB connection unit 204 establishes a virtual USB connection by interworking with the virtual USB controller 202 of the virtual machine driving host 100 at which the virtual machine 210, which has live-migrated, is located.

Also, the virtual USB connection unit 204 includes a buffer memory (not shown) for temporarily storing data, i.e., USB data transmitted to and received from the USB device 150 connected to the remote USB device server 140 at a point in data transmission at which the virtual machine live-migrates. The virtual USB connection unit 204 provides the USB data stored in the buffer memory to the virtual machine driving host 100 to which the virtual machine has live-migrated, thereby preventing a loss of data during an interval in which the connection of the virtual USB is stopped (i.e., an interval during which live-migration is proceeding).

Namely, when live-migration is proceeding, the virtual USB host unit 302 and the USB core function unit 300 continuously perform the USB operation irrespective of the live-migration, and provide the USB data resulting from the USB operation to the virtual USB connection unit 204 of the remote USB device server 140 so as to be stored in the buffer memory.

Start data to be re-transmitted in the USB data stored in the buffer memory may be designated by interworking with the virtual USB controller 202 of the source virtual machine driving host 100 and the destination virtual machine driving host 100 of live migration.

The virtual USB controller 202, which is middleware for controlling a virtual USB operation overall, may be installed in each of the virtual machine driving host 100 and the remote USB device server 140 and may execute an overall virtual USB operation.

The process of the live-migration of the virtual machine in the virtual machine driving host having the foregoing configuration will now be described in detail with reference to FIGS. 4 to 5C.

Figure 4:
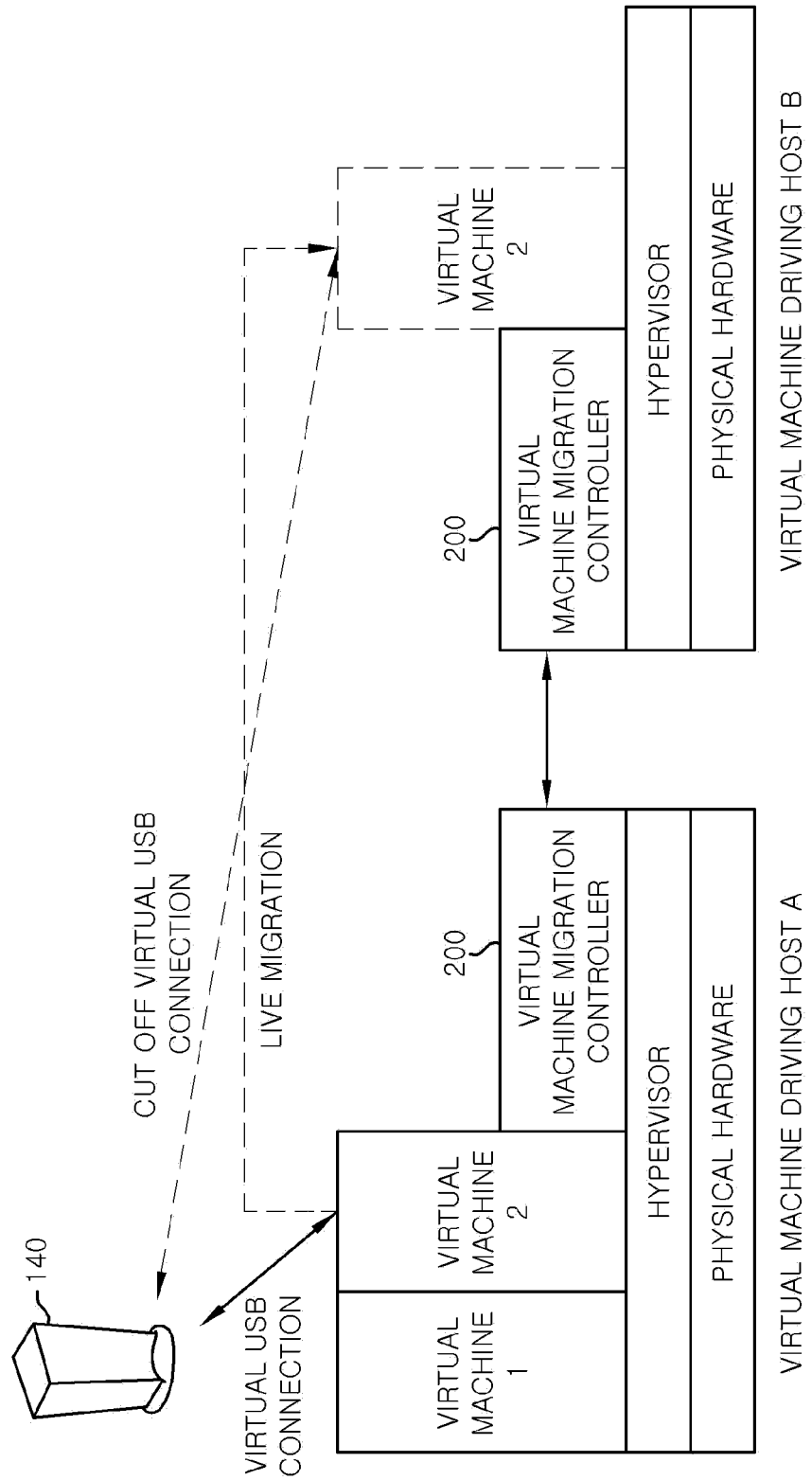
FIG. 4 shows an example of live-migration of the virtual machine in the virtual machine driving host having a hypervisor in accordance with the embodiment of the present invention with the embodiment of the present invention.

FIG. 4 shows an example of live-migration of the virtual machine in the virtual machine driving host having a hypervisor in accordance with the embodiment of the present invention, and FIGS. 5A to 5C show a flowchart illustrating a process of live migration by the remote USB system in accordance with the embodiment of the present invention.

As shown in FIG. 4, virtual machine driving hosts A and B include hypervisor at an upper layer of physical hardware, and virtual machines 1 and 2, to which USB devices connected to connection terminals of the remote USB device server 140 are allocated, and the configuration as shown in FIG. 2 along with the virtual machine migration controller 200 for controlling the virtual machines 1 and 2 provided at an upper layer of the hypervisor. In this state, a process in which the virtual machine driving host A moves the virtual machine 2 to the virtual machine driving host B through live-migration will now be described in detail with reference to FIGS. 5A to 5C. Herein, the description will be made in a case of the read mode in which data is read from the USB device 150 via the remote USB device server 140 to the virtual machine 2. As shown in FIG. 4, in the virtual machine driving hosts A and B, as the USB device 150 is connected to a connection receptacle of the remote USB device server 140, the virtual USB host unit 302 of the remote USB device server 140 is connected to the virtual USB device emulation unit 206 of the virtual machine driving host A, and the USB device 150 connected to the remote USB device server 140 is recognized as a virtual USB device in the virtual driving machine driving host 100. In other words, the virtual USB device emulation unit 206 recognizes the USB device 150 connected to the remote USB device server 140, as a USB device connected to the connection receptacle of the virtual machine driving host 100 to provide a USB function through an interaction with a different configuration.

In this state, as shown in FIG. 5A, when live-migration starts, the virtual machine migration controller 200 of the virtual machine driving host A informs the virtual USB controller 202 accordingly, and the virtual USB controller 202 inquires of the virtual USB allocation unit 208 about a transmission stop point in data transmission, receives a corresponding transmission stop point, and informs the remote USB device server 140 about the received transmission stop point, as shown in FIGS. 5A and 5B.

Accordingly, the virtual USB controller 202 of the remote USB device server 140 provides the transmission stop point to the virtual USB connection unit 204 of the remote USB device server 140 so that data transmitted to and received from the USB device 150 after the transmission stop point, namely, USB data transmitted from the virtual USB host unit 302 and the USB core function unit 300 of the remote USB device server 140, can be stored in the buffer memory of the virtual USB connection unit 204.

Thereafter, the virtual machine driving host A provides the information on the remote USB device server 140, the information on the USB device connected to the remote USB device server 140, the information on the virtual USB connection to the virtual machine driving host A itself, and the like, to the virtual machine driving host B, as shown in FIGS. 5A to 5C. Then, the virtual USB controller 202 of the virtual machine driving host B establishes a virtual USB connection with the remote USB device server 140 by using the information provided from the virtual machine driving host A and receives the USB data stored in the buffer memory within the virtual USB connection unit 204 of the remote USB device server 140.

In other words, the virtual USB controller 202 of the virtual machine driving host B requests the virtual USB connection unit 204 of the remote USB device server 140 for a virtual USB connection by using the information provided from the virtual machine driving host A. Accordingly, the virtual USB connection unit 204 of the remote USB device server 140 establishes a virtual connection through a connection acceptance. At this time, the virtual USB connection unit 204 of the virtual machine driving host B receives data after the transmission stop point stored in the buffer memory of the virtual USB connection unit 204 of the remote USB device server 140 and stores the same in its buffer memory.

After establishing the virtual USB connection, the virtual machine driving host B provides the connection information to the virtual USB controller 202, and the virtual USB controller 202 transfers the information on the virtual USB device provided from the virtual machine driving host A and the virtual USB connection information to the virtual USB device emulation unit 206. Accordingly, the virtual USB device emulation unit 206 is made ready for a setting for emulating the USB device 150, and when such a setting is completed, the virtual USB controller 202 inquires of the virtual machine migration controller 200 about whether or not live-migration of the virtual machine 2 has been completed.

When the migration of the virtual machine 2 has been completed, the virtual USB allocation unit 208 allocates the USB device 150 to the virtual machine 2 which has migrated.

When the allocation of the USB device 150 to the virtual machine 2 has been completed, the virtual USB controller 202 instruct the virtual machine migration controller 200 to drive the virtual machine 2, and the virtual USB connection unit 204 in the remote USB device server 140 transfers the data stored in its buffer memory to the virtual machine 2 through the virtual USB device emulation unit 206. In accordance with the embodiments of the present invention, the data, starting from the transmission stop point, is stored in the buffer memory, and when migration of a virtual machine is completed, the stored data is provided to the virtual machine which has migrated, whereby the user of the virtual machine can continuously use the virtual USB seamlessly without a loss of data regardless of the live-migration of the virtual machine.

Also, the user convenience of using the virtual USB can be improved, and since the live-migration is available, a virtual machine manager can effectively manage virtual machine host server resources, and various services such as a network environment, a load state of a server, a failure recovery, and the like can be provided.

While the invention has been shown and described with respect to the particular embodiments, it will be understood by those skilled in the art that various changes and modification may be made without departing from the spirit of the invention as defined in the following claims.

What is claimed is:

1. A host system for maintaining virtual connectivity in live-migration of a virtual machine comprising:
   a virtual machine migration controller for performing live-migration for moving a virtual machine and driving the virtual machine;
   a virtual connection unit for establishing a virtual connection with a remote device server to which a device allocated to the virtual machine is connected, and receiving from the remote device server data transmitted from the device during the live-migration; and
   a virtual controller for providing information for establishing the virtual connection to a destination host of the live-migration, or receiving the information for establishing the virtual connection from a source host from which the live-migration starts and providing the information to the virtual connection unit, driving the virtual machine which has live-migrated by controlling the virtual machine migration controller to thereby provide the data received by the virtual connection unit to the driven virtual machine,
   wherein when the live-migration starts, the virtual controller recognizes a data transmission stop point in data transmission and provides the data transmission stop point to the remote device server, and
   wherein the remote device server stores the data transmitted to and received from the device after the transmission stop point in data transmission, and provides the stored data to the destination host.

2. The system of claim 1, wherein the virtual connection unit includes a buffer memory for storing the data provided from the remote device server.

3. The system of claim 1, wherein when the live-migration starts, the virtual controller provides information on the virtual device allocated to the virtual machine which live-migrates, virtual connection information, and information on the remote device server to the destination host.

4. The system of claim 1, wherein the device is a USB device.

5. The system of claim 1, wherein the host system uses a virtual machine monitor scheme, a scheme using a hypervisor, or a scheme having a host operating system.

6. A remote device server for maintaining virtual connectivity in live-migration of a virtual machine, the server comprising:
   a core function unit for recognizing a device connected to a connection terminal and performing an operation of the device;
   a virtual host unit for controlling the device recognized by the core function unit and connected to a virtual machine driving host through a network for allowing the device to be recognized as a virtual device; and
   a virtual connection unit for establishing a virtual connection with a new host to which a virtual machine, to which the virtual device was allocated, has moved through live-migration, and transmitting data transmitted to and received from the device during the live-migration to the new host,
   wherein when the live-migration starts, a data transmission stop point in data transmission is recognized and provided to the remote device server, and
   wherein the remote device server stores the data transmitted to and received from the device after the transmission stop point in data transmission, and provides the stored data to the new host.

7. The server of claim 6, wherein the virtual connection unit includes a buffer memory for storing the data transmitted to and received from the device during the live-migration.

8. The server of claim 6, wherein the device is a USB device.

9. A method for maintaining virtual connectivity in live-migration of a virtual machine comprising:
   when a virtual machine to which a device had been allocated starts live-migration, recognizing a transmission stop point in data transmission, and then providing the transmission stop point to a remote device server to which the device is connected, so that data transmitted to or received from the device during the live-migration can be stored in the remote device server;
   transmitting, by the virtual machine, information for maintaining connectivity to a host to which the virtual machine live-migrates, to establish a virtual connection between the remote device server and the host, and allocating the device to the host; and
   transmitting the data stored in the remote device server to the host as the virtual connection is established, so as to be stored in the host, and when the live-migration is completed, transferring the data stored in the host to the virtual machine which has live-migrated.

10. The method of claim 9, wherein the information for maintaining connectivity includes information on the remote device server, information on the device, and information on the virtual connection.

11. The method of claim 9, wherein the device is a USB device.

12. A method for maintaining virtual connectivity in live-migration of a virtual machine comprising:
   as a device is connected to a connection terminal, connecting the device to a virtual machine driving host through a network, to be connected to a virtual machine;
   when the virtual machine starts live-migration, receiving a transmission stop point in data transmission from the virtual machine driving host;
   storing data transmitted to and received from the device starting from the transmission stop point;
   establishing a virtual connection with a new host in response to a request from the new host to which the virtual machine is to be moved through live-migration;
   providing the stored data to the new host after establishment of the virtual connection; and
   when the virtual machine has been completely moved to the new host through live-migration, stopping storing of the data.

* * * * *